United States Patent [19]
Takahashi et al.

[11] Patent Number: 5,402,331
[45] Date of Patent: Mar. 28, 1995

[54] POWER DEVICE

[75] Inventors: Isao Takahashi, Nagaoka; Masataka Mitani, Kyoto, both of Japan

[73] Assignee: Matsushita Electric Works, Osaka, Japan

[21] Appl. No.: 21,908

[22] Filed: Feb. 24, 1993

[30] Foreign Application Priority Data

Feb. 25, 1992 [JP] Japan .................................. 4-038212
Jan. 26, 1993 [JP] Japan .................................. 5-011118

[51] Int. Cl.⁶ ............................................. H02M 7/217
[52] U.S. Cl. ................................. 363/89; 363/44; 363/53; 363/124; 323/225
[58] Field of Search ............... 323/223, 225, 282, 351; 363/39, 44, 50, 53, 89, 124, 131

[56] References Cited

U.S. PATENT DOCUMENTS

| | | | |
|---|---|---|---|
| 5,038,267 | 8/1991 | De Doncker et al. | 363/89 |
| 5,235,504 | 8/1993 | Sood | 363/53 |
| 5,251,119 | 10/1993 | Maehara | 363/37 |
| 5,274,540 | 12/1993 | Maehara | 363/37 |

*Primary Examiner*—Jeffrey L. Sterrett
*Attorney, Agent, or Firm*—Leydig, Voit & Mayer

[57] ABSTRACT

A power device of improved input power-factor, reduced high frequency noise with rush current upon power source connection restrained, reduced switching loss and improved circuit efficiency is provided by an arrangement in which an output of a full-wave rectifying circuit is subjected to a high-frequency interruption through a switching means, an energy accumulated in an inductor connected to the switching means is applied through another switching means to a smoothing capacitor, and a current from the full-wave rectifying circuit so as to flow to the capacitor is interrupted by still another switching means.

9 Claims, 15 Drawing Sheets

POWER DEVICE

BACKGROUND OF THE INVENTION

This invention relates generally to power devices of switching type with an input from an AC power source and, more particularly, to a power device improved in rush current prevention and in input power-factor upon connection of the power source, and capable of optimumly reducing any higher harmonic current in the input.

DESCRIPTION OF RELATED ART

For conventional power devices, there has been a power device of such circuit arrangement as shown in FIG. 1, in which input terminals of a full-wave rectifying circuit DB are connected through a power source switch SW to an AC power source Vs, and a smoothing capacitor C1 is connected in parallel to output terminals of the full-wave rectifying circuit DB, while a series circuit of a primary winding N1 of a high frequency transformer T and a switching element. Q2 is connected in parallel to the capacitor C1, a secondary winding N2 of which transformer T is connected, through a series circuit of a diode D1a and an inductor L21, to a parallel circuit of a capacitor C21 and a load Z, with a diode D1b connected to a junction point between the diode D1a and the inductor L21 to be of such polarity as shown in the drawing with respect to the secondary winding N2 of the high frequency transformer T.

In this particular instance, the switch SW turned ON causes a voltage of the AC power source Vs to be applied to the full-wave rectifying circuit DB to be thereby rectified. The full-wave rectified voltage is smoothed by the capacitor C1 and a DC voltage is charged in this capacitor C1. The thus charged DC voltage in the capacitor C1 is caused to be applied intermittently to the primary winding N1 of the high frequency transformer T as the switching element Q2 is subjected to high-frequency switching, accompanying to which a high frequency voltage is induced in the secondary winding N2 of the transformer T and this high frequency voltage is half-wave rectified at the diode D1a to be charged, through the inductor L21, in the capacitor C21 as a DC voltage which is to be applied to the load Z. When the high frequency voltage is of a polarity in reverse biasing direction of the diode D1a, an accumulated energy in the inductor L21 is discharged through the diode D1b to the capacitor C21, whereby any ripple in a voltage across the capacitor C21 can be reduced, and the DC voltage supplied to the load Z can be controlled by subjecting an ON period of the switching element Q2 to a pulse width control.

With the power device shown in FIG. 1, therefore, it is possible to supply to the load Z the DC voltage of less ripple and of an optional magnitude. However, since the smoothing capacitor C1 is connected in series to the DC output terminals of the circuit DB for full-wave rectifying the current from the AC power source Vs, there arises a problem that a rush current several ten times as large as that in a steady operation flows upon turning-ON of the power source switch SW. Further, in the steady operation, there is another problem that an input current is of such sharp waveform as shown in FIG. 2 to be poor in the input power-factor, due to that the input current is caused to flow into the capacitor C1 only in a period adjacent peak value of instantaneous voltage of the AC power source Vs and not caused to flow in other period.

Further, when the input current to the capacitor C1 is of the sharp waveform, the power source voltage is made to be of a trapezoidal waveform so as to increase higher harmonics, consequent on which there arise various problems of an electromagnetic induction trouble on communication lines, beating of a transformer applied by commercial AC power source, deterioration in waveform of the power device output due to a resonance of a capacitor inserted for input power-factor improvement with a power source impedance, damaging of the capacitor, and so on.

In view of the above respect, there has been suggested such a power device as shown in FIG. 3 for reducing any distortion in the input current waveform to the capacitor C1 and improving the input power-factor. In this power device, there is inserted, between the output terminals of the full-wave rectifying circuit DB and the smoothing capacitor C1, a boosting type chopper circuit comprising an inductor L1, switching element Q4 and diode D2. This arrangement has been known generally as an active filter system, in which the switching element Q4 attains its switching operation at a frequency sufficiently higher than the frequency of commercial AC power from the AC power source Vs, so that the input current from the source Vs will be of a waveform made closer to sinusoidal wave, and the DC voltage obtained at the smoothing capacitor C1 will be made constant. That is, even in a period when the input voltage from the AC power source Vs is of a low instantaneous value, a current is made to flow to the inductor L1 from the rectified output terminals of the full-wave rectifying circuit DB upon turning ON of the switching element Q4, and an accumulated energy in this inductor L1 is discharged through the diode D2 to the capacitor C1 upon turning OFF of the switching element Q4. Accordingly, the period in which the input current flows is prolonged and the distortion in the input current waveform can be reduced. It is also possible to increase charging frequency per a unit time of the smoothing capacitor C1, and the voltage ripple of the capacitor C1 is reduced.

Accordingly, it will be possible to attain the input power-factor substantially of 100% by employing the power device of such arrangement as shown in FIG. 3. However, even this power device involves a problem that the rush current from the AC power source Vs and occurring upon the turning ON of the source switch SW cannot be restrained. In order to avoid such occurrence of the rush current, therefore, there has been suggested to insert, as shown in FIG. 4, a parallel circuit of a TRIAC Q5 and a current limiting resistor R on the side of AC input terminals of the full-wave rectifying circuit DB. In this case, the arrangement is so made that, as the source switch SW is turned ON, the capacitor C1 is sufficiently charged by the current limiting resistor R and thereafter the TRIAC Q5 is turned ON, and the rush current occurrence can be restrained. Here, it will be possible to attain the same operation by employing a relay contact in place of the TRIAC Q5, but there arises an economic problem due to that the circuit arrangement of the power device is rendered complicated. Further, especially in case of the power device for a relay, its life is restricted. Furthermore, while it may be possible to employ a power thermister or the like as the current limiting resistor, this will cause another problem to arise that the device is decreased in circuit efficiency and it becomes difficult to prevent any rush current from occurring upon short interruption of power supply service.

In order to render the input current of the power device provided with the smoothing capacitor C1 to be closer to the sinusoidal wave, it is required to provide such chopper circuit as shown in FIG. 3, and, for restraining the occurrence of the rush current upon making of the power source, it is required to provide such rush current restraining circuit as shown in FIG. 4, as will be clear from the foregoing description. That is, in order to overcome the respective foregoing problems, it is required to incorporate in the power device of FIG. 3 such rush current restraining arrangement as in FIG. 4, but this causes another problem to arise in that the incorporation renders the circuit arrangement to be complicated to have manufacturing costs increased, and that semiconductor elements for passing a larger current have to be increased in number so that the circuit efficiency will be deteriorated and eventually the power device has to be increased in size.

In practice, there have been still employed the general power devices adapted at least to the retention of the input power-factor, but not provided with any such rush current restraining arrangement as shown in FIG. 4. Since in recent years the use of office automation equipments has been spread, there is a risk that the office automation equipments are caused to malfunction by the rush current. In printers, for example, employed in these equipments, it has been found that the risk of the malfunction arises provided that the source voltage is lowered by 20% and this voltage drop continues only for 10 msec.

In Japanese Patent Laid-Open Publication No. 60-134776 of T. Okamoto et al, there has been disclosed a power device in which a switching element in the chopper circuit realizing the socalled active filter system is commonly employed also as a switching element of an inverter circuit. According to this invention of Okamoto et al, the switching element is not increased in the number, so that the device can be relatively small in size, while the input current is rendered to be closer to the sinusoidal wave and the input power-factor is also improved. However, this device of Okamoto et al still has not adopted any measure for restraining the rush current, and it is necessary to be furnished with such rush current restraining circuit as in FIG. 4.

SUMMARY OF THE INVENTION

It is a primary object of the present invention, therefore, to provide a power device which does not allow any rush current to flow upon connection of the power source, and is still high in the input power-factor, capable of reducing required number of the switching element to allow the device to be minimized in size and to be inexpensive.

Another object of the present invention is to provide a power device which is capable of supplying a DC output to a load while attaining the foregoing primary object.

Still another object of the present invention is to provide a power device which is capable of supplying an AC output to such load as a discharge lamp while establishing the foregoing primary object.

Other objects and advantages of the present invention shall become clear as following description of the invention advances with reference to accompanying drawings.

Figure 1:
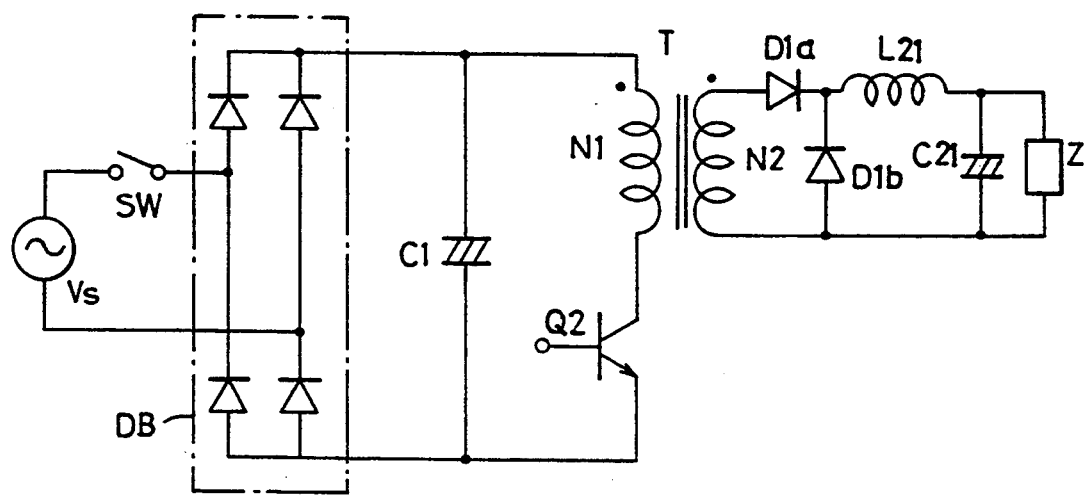
FIG. 1 is a circuit diagram showing a power device according to a prior art.
Figure 2:
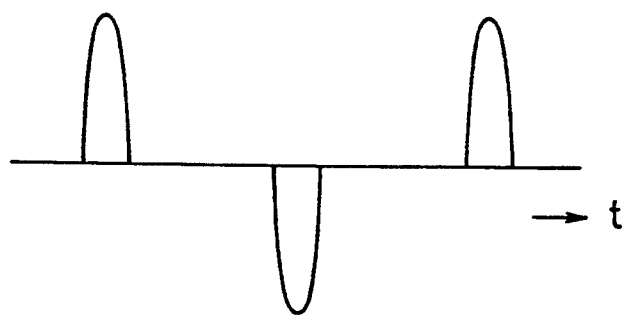
FIG. 2 is a waveform diagram showing the operation of the input current of the power device in FIG. 1.
Figure 3:
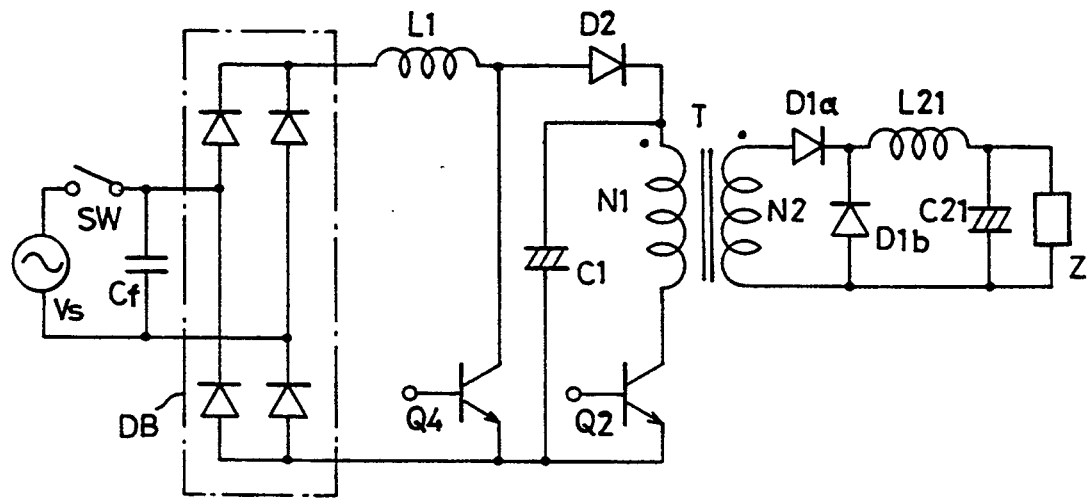
FIG. 3 shows in a circuit diagram another power device also of a prior art.
Figure 4:
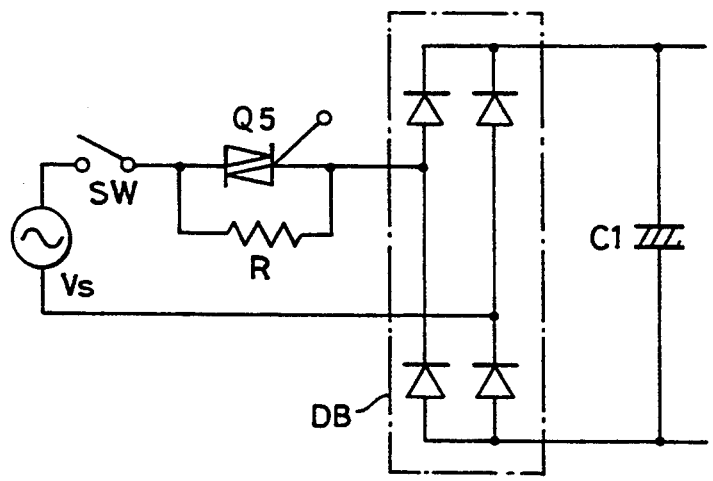
FIG. 4 shows in a fragmentary circuit diagram a further power device of another prior art.

While the invention shall now be described in the followings with reference to the respective embodiments shown in the drawings, it will be appreciated that the intention is not to limit the invention only to these embodiments shown but rather to include all alterations, modifications and equivalent arrangements possible within the scope of appended claims.

DETAILED DESCRIPTION OF THE PREFERRED EMBODIMENTS

Figure 5:
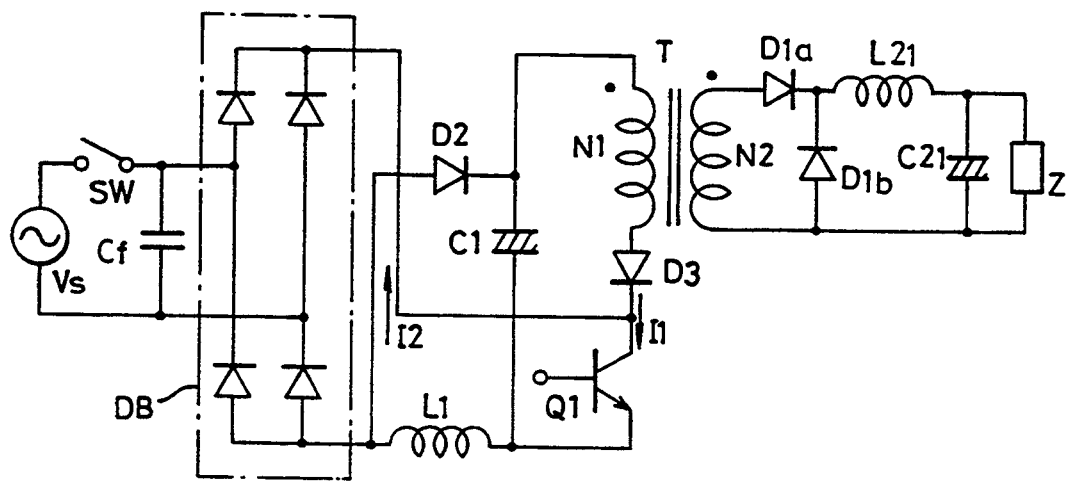
FIG. 5 is a circuit diagram showing a power device in an embodiment for obtaining a DC output according to the present invention.

Referring now to FIG. 5, in which there is shown an embodiment of the power device according to the present invention, the device in this embodiment is adapted to a supply of DC output. More specifically, AC input terminals of a full-wave rectifying circuit DB are connected through a power source switch SW to an AC power source Vs, while a smoothing capacitor Cf for use as a filter and of a small capacity is connected in parallel to the AC input terminals. To DC output terminals of the full-wave rectifying circuit DB, an inductor L1 is connected through a switching element Q1, and a smoothing capacitor C1 is connected through a reverse current preventing diode D2 to both ends of the inductor L1, while a primary winding N1 of high frequency transformer T is connected across the capacitor C1 through a diode D3 in such polarity as shown and a switching element Q1.

To a secondary winding N2 of the high frequency transformer T, there is connected a parallel circuit of a capacitor C21 and a load Z through a series circuit of a diode D1a and an inductor L21, and a diode D1b is connected to a junction point between the diode D1a and the inductor L21 in such polarity as shown with respect to the capacitor C21.

Across the switching element Q1 connected to the primary winding N1 of the transformer T, a snubber circuit (not shown) can be connected optimumly. It will be also appreciated that, while FIG. 5 shows an example of employing a bipolar transistor as the switching element Q1, the transistor may be replaced by, for example, a power MOSFET.

Figure 6:
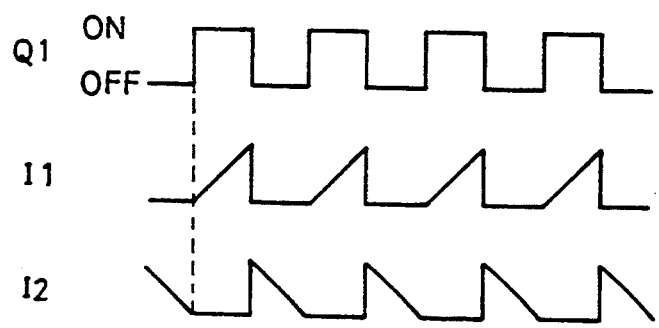
FIG. 6 shows in waveform diagrams the operation of the power device in FIG. 5.

Referring to the operation of the power device shown in FIG. 5 in conjunction with FIG. 6, a turning ON of the switching element Q1 causes a rectified output voltage of the full-wave rectifying circuit DB to be applied to the inductor L1. Assuming here that the inductor L1 has an inductance value L, the full-wave rectifying circuit DB provides the output voltage Vd and the switching element Q1 has a turning ON voltage Vs, a current I1 flowing through the inductor L1 is to linearly increase at a gradient of $di/dt = (Vd - Vs)/L$.

As the switching element Q1 is turned OFF next, an electromagnetic energy accumulated in the inductor L1 is discharged through the diode D2 to the capacitor C1, and this capacitor C1 is charged thereby. The voltage charged in the capacitor C1 can be increased or decreased by controlling ON time of the switching element Q1. When the switching element Q1 is turned ON in a state where the capacitor C1 is charged, next, a current is caused to flow from the capacitor C1 through the primary winding N1 of the high frequency transformer T, diode D3 and switching element Q1, upon which a voltage in a polarity of normally biasing the diode D1a is generated in the secondary winding N2 of the transformer T, whereby the diode D1a is made conductive and a current is made to flow through the inductor L21 to the parallel circuit of the capacitor C21 and load Z.

As the switching element Q1 is turned OFF next, a counter electromotive force is generated in the primary winding of the high frequency transformer T, upon which a voltage in a polarity of reversely biasing the diode D1a is generated within the secondary winding N2 of the transformer T, whereby the diode D1a is turned to non-conducting state, and the energy accumulated in the inductor L21 is discharged through the diode D1b to the parallel circuit of the capacitor C21 and load Z. Any ripple in both end voltage of the load Z is reduced thereby. The voltage charged in the capacitor C21 can be increased or decreased by controlling the ON time of the switching element Q1.

In the foregoing arrangement of the power device shown in FIG. 5, more strictly speaking, the AC source power is rectified by the full-wave rectifying circuit, the rectified output of the circuit is subjected to high-frequency interruption by means of the switching element to have the electromagnetic energy accumulated in the inductance element, and this electromagnetic energy is made to be all injected through the reverse current preventing diode into the smoothing capacitor, so that input current waveform can be made to be sinusoidal and the input power-factor can be elevated. Further, since the diode for preventing the output current of the full-wave rectifying circuit from directly flowing to the smoothing capacitor is provided, no rush current is caused to flow upon making of the power source. Because the switching element employed in the chopper circuit for improving the input power-factor is also used as the switching element for the make and break of the current flowing from the smoothing capacitor to the primary winding of the high frequency transformer, the circuit arrangement can be simplified, and intended minimization in size and weight of the power device can be realized. With the ON time of the switching element controlled, it is enabled to supply to the load a DC voltage of any optional magnitude. Because of the rectification and smoothing of the high frequency voltage, further, the smoothing capacitor can be of a small capacity, and the device can be minimized in size and weight in this respect, too.

According to another feature of the present invention, the power device is adapted to a supply of an AC output to the load, while keeping, as in the foregoing embodiment of FIG. 5, the rush current not to flow upon making of the power source, the input power-factor to be high, the high frequency to be controllable, required number of the switching element to be small, the size and weight of the device to be the minimum to be inexpensive, any electric noise generation to be the minimum, and the circuit efficiency to be high.

Figure 8A:
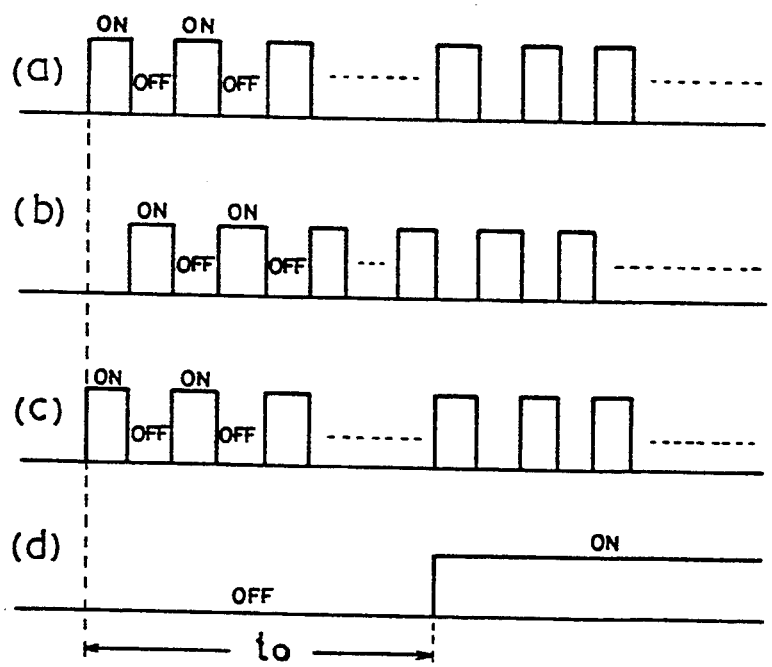
FIG. 8a and 8b show in waveform diagrams the operation of the power device in FIG. 7.
Figure 8B:
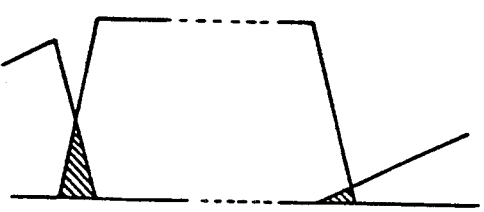

Referring more specifically to the above, waveforms of the voltage and current across the switching means generally involve a delay in waveform variation depending on rise and fall characteristics of the switching means, as shown in FIG. 8b, and there arise mutually overlapping portions shown as hatched between the voltage waveform and the current waveform upon turning ON and OFF of the switching means. Such overlapping portions denote the power loss in the switching operation, which power loss is apt to enlarge so as to lower the circuit efficiency and to expand the heat capacity, and a countermeasure for heat radiation becomes necessary. Due to this, the switching means is required to be provided with a heat radiating plate or the like, which develops a tendency to increase external size and manufacturing costs of the device. Further, abrupt voltage rise and fall generated upon the turning ON and OFF of the switching means render electric noise of high frequency component to frequently occur.

In an event when, in particular, a discharge lamp is employed as the load and this discharge lamp is subjected to a square wave lighting, a wiring to the lamp or the lamp itself acts as an antenna so as to radiate a high frequency noise, and any possible measure for restraining the noise, including a shielding of the lamp or the like, will be undesirable in view of required increase in the costs but a loss in the brightness and so on.

Figure 7:
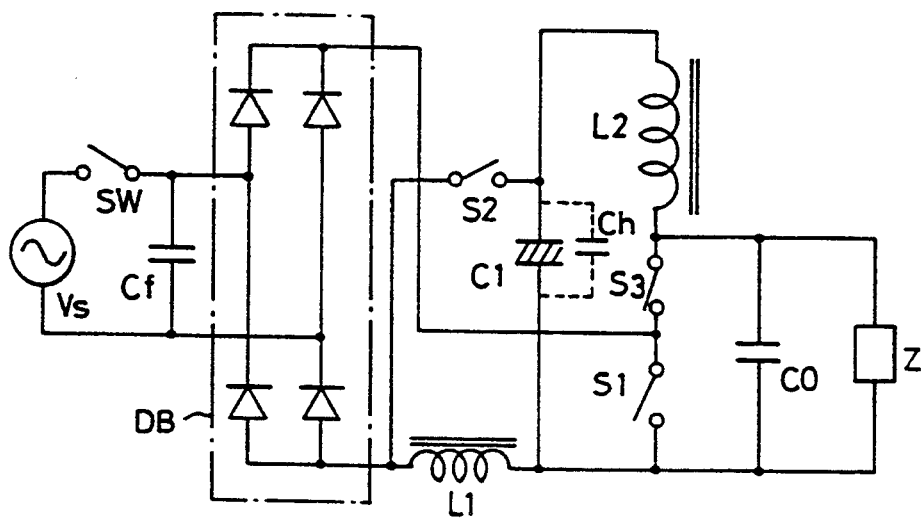
FIG. 7 is a circuit diagram showing another embodiment of the power device according to the present invention, for obtaining an AC output.

Taking these respects into account, another embodiment of the power device according to the foregoing another feature of the present invention is formed in such arrangement as in FIG. 7. That is, the AC input terminals of the full-wave rectifying circuit DB are connected through the power source switch SW to the AC power source Vs, and a filtering capacitor Cf of a small capacity is connected in parallel to the AC input terminals. To the DC output terminals of the full-wave rectifying circuit DB, an inductor L1 is connected through a switching means S1, while the smoothing capacitor C1 is connected across the inductor L1 through a switching means S2. The inductor L2 is connected through a series circuit of a switching means S3 and the switching means S1 to both ends of the smoothing capacitor C1, and a parallel circuit of a capacitor CO and a load Z is connected across the series circuit of the switching means S1 and S3. The inductor L2 and capacitor CO respectively have a constant so set as to resonate at operating frequency of the respective switching means S1 to S3, and the load Z is connected so that a voltage will be supplied thereto from the capacitor CO. The load Z has an impedance value so set as not to remarkably impair the resonance of the inductor L2 and capacitor CO. In an event where a freewheel current flows, there is shown a tendency that the capacitor C1 is elevated in the impedance with respect to the high frequency, and such a high frequency bypassing capacitor Ch as shown in FIG. 7 may be connected in parallel to the capacitor C1.

Referring to the operation of the power device shown in FIG. 7 in conjunction with FIG. 8a, the switching means S1 and S2 are alternately driven as shown by waveforms (a) and (b) of FIG. 8a. Thus, as the switching means S1 is turned ON and the other switching means S2 is turned OFF, the rectified output voltage of the full-wave rectifying circuit DB is applied to the inductor L1, and the electromagnetic energy is accumulated in the inductor L1. As the switching means S1 is made OFF and the switching means S2 is made ON, next, the accumulated electromagnetic energy in the inductor L1 is supplied through the switching means S2 to the capacitor C1 to thereby charge the same. The charging voltage to the capacitor C1 can be elevated or lowered by controlling the ON time of the switching means S1.

When the switching means S1 turns ON in the state where the capacitor C1 is charged, next, the voltage at the capacitor C1 is applied to the inductor L2 so long as the switching means S3 is ON. Further, upon the turning OFF of the switching means S1, there flows a resonance current to the resonance circuit of the inductor L2 and capacitor CO. In this case, the switching means S1 is employed commonly as a switching element in a single-element resonance inverter circuit comprising the inductor L1, capacitor CO and load Z, and also as a switching element of a chopper circuit comprising the AC power source Vs, full-wave rectifying circuit DB, inductor L1, switching means S2 and capacitor C1.

For the switching means S3, there may be employed two driving methods. First, in an event where the switching means S3 is driven to be ON and OFF in synchronism with the switching means S1 as shown by a waveform (c) in FIG. 8a, the rush current to the capacitor C1 upon making of the power source. That is, in the ON state of the switching means S3, the switching means S1 is also in its ON state, and the rush current is prevented from flowing through the switching means S3 and inductor L2 to the capacitor C1. Further, when the switching means S1 is OFF, the switching means S3 is also OFF, the rush current is prevented from flowing through the switching means S3 and inductor L2 to the capacitor C1. Further, when the switching means S3 is driven to be turned ON after passing of time $t_0$ required until the time when the capacitor C1 is sufficiently charged by the chopper operation of the switching means S1 as shown by a waveform (d) in FIG. 8a, inductor L1 and switching means S2, any current flowing from the AC power source Vs through a path of the full-wave rectifying circuit DB, switching means S3, inductor L2, capacitor C1, inductor L1 and full-wave rectifying circuit DB is restrained since the capacitor C1 has been preliminarily charged, and the rush current can be prevented from flowing.

Figure 9:
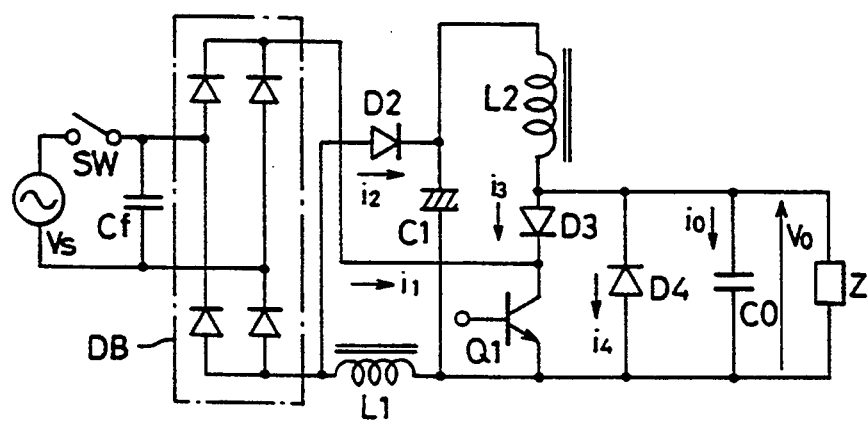
FIG. 9 shows in a circuit diagram another embodiment of the power device according to the present invention.

In further embodiments described in the followings with reference to FIG. 9 et seq., the switching means S1 to S3 in the foregoing embodiment of FIG. 7 are respectively employed in the form of a switching element Q1 and diodes D2 and D3.

Referring to FIG. 9, there is shown another embodiment of the power device adapted to the supply of AC output. In the present instance, the switching element Q1 is constituted preferably by a power bipolar transistor, power MOSFET, IGTB or the like. A further diode D4 is preferably connected in reverse parallel to the series circuit of the diode D3 and switching element Q1. With this diode D4, it is possible to restrain the application of reverse biasing voltage to the switching element Q1, so that the switching element Q1 can be prevented from being thereby deteriorated, and the degree of freedom of circuit designing in applying the device to the inverter circuit can be expanded. Other constituents in the present embodiment are substantially the same as those in the embodiment of FIG. 7.

In the power device of the present embodiment, the rush current occurring upon making of the power source switch SW tends to flow through a path of the full-wave rectifying circuit DB, diode D3, inductor L2, capacitor C1 and inductor L1, but the flow is blocked by the diode D3, and no rush current flows through this path. Further, a chopper circuit is formed by the full-wave rectifying circuit DB, switching element Q1, inductor L1, diode D2 and smoothing capacitor C1, so that a high input power-factor can be attained. Further, with an insertion of such low-pass filter (LPF) as a capacitor Cf on the side of the source input terminals, it is made possible to smooth the input voltage to be sinusoidal, and thereby the high frequency current can be remarkably reduced.

Figure 10:
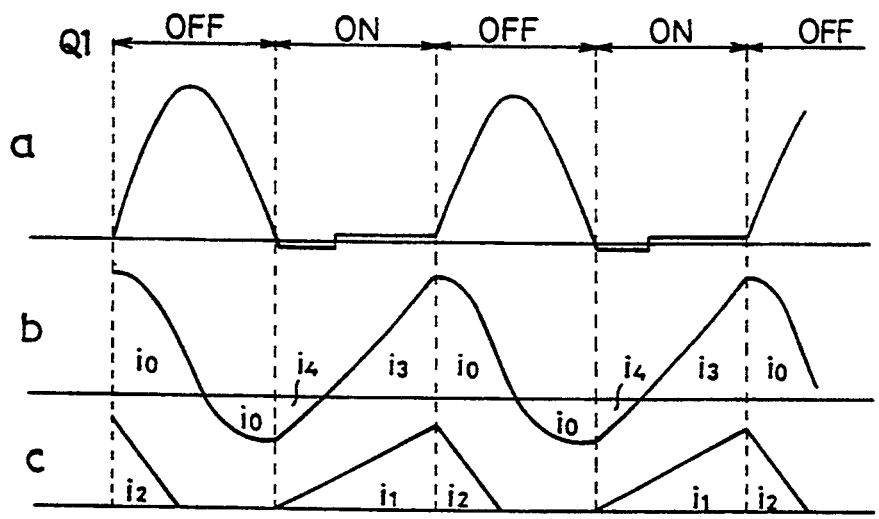
FIGS. 10 and 11 show in waveform diagrams the operation of the embodiment shown in FIG. 9.
Figure 11:
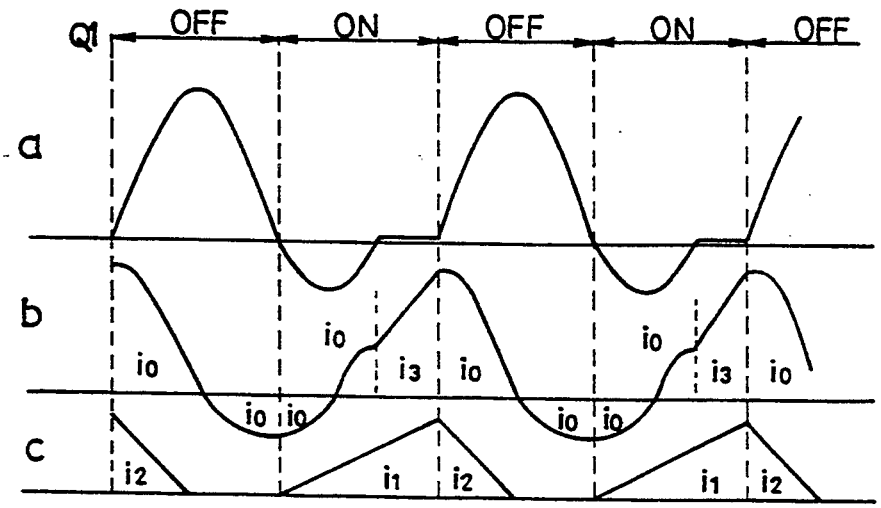

Referring to the operation of the present embodiment by references to FIG. 9 in conjunction with FIGS. 10 and 11, $V_0$ denotes a voltage across the load Z, $i_0$ is a current flowing to the capacitor CO, $i_1$ is the output current of the full-wave rectifying circuit DB, $i_2$ is a normal directional current of the diode D2, $i_3$ is a normal directional current of the diode D3 and $i_4$ is a reverse directional current of the diode D4, while FIG. 9 shows these symbols at their relevant portions. In FIGS. 10 and 11, "a" represents the voltage $V_0$ across the load Z, "b" represents current waveforms at respective parts in the inverter section, and "c" represents current waveforms at respective parts in the chopper section. Here, the load Z is of an impedance value so set as not impairing required conditions for the resonance system, and the current flowing to the load Z substantially will be of the same waveform as that of the current $i_0$ flowing to the capacitor CO. In practice, a half-wave current optimumly of a high frequency will be supplied to the load Z so that a current having a quiescent time.

In FIG. 10, there is additionally shown an operational waveform occurring in the event where the diode D4 is provided for a flow of the freewheel current, and the voltage $V_0$ across the load Z is made to be sinusoidal half waves due to the resonance of the inductor L2 and capacitor CO. A current flowing at this time to the switching element Q1 is a composite current of the currents $i_1$ and $i_3$, and an overlapping of this current ($i_1+i_3$) with the voltage $V_0$ can be reduced. Accordingly, in the case where the load Z is a discharge lamp, for example, any loss at the switching element Q1 can be made remarkably smaller than in the case of the socalled square wave lighting. Further, the rise and fall of the voltage $V_0$ across the load are not made to be relatively abrupt, and the occurrence of the high frequency noise can be optimumly restrained, as will be well appreciated.

In FIG. 11, there is shown an operational waveform in the case where the diode D4 for the flow of freewheel current is not provided, and the voltage $V_0$ across the series circuit of the switching element Q1 and diode D3 involves parts of a negative voltage, that is, periods in which a reverse voltage is applied to the switching element Q1. At this time, the power source circuit designed with a sufficient care for the reverse biasing voltage to the switching element Q1 will allow the required number of parts reduced to be contributive to a reduction of costs.

Figure 12:
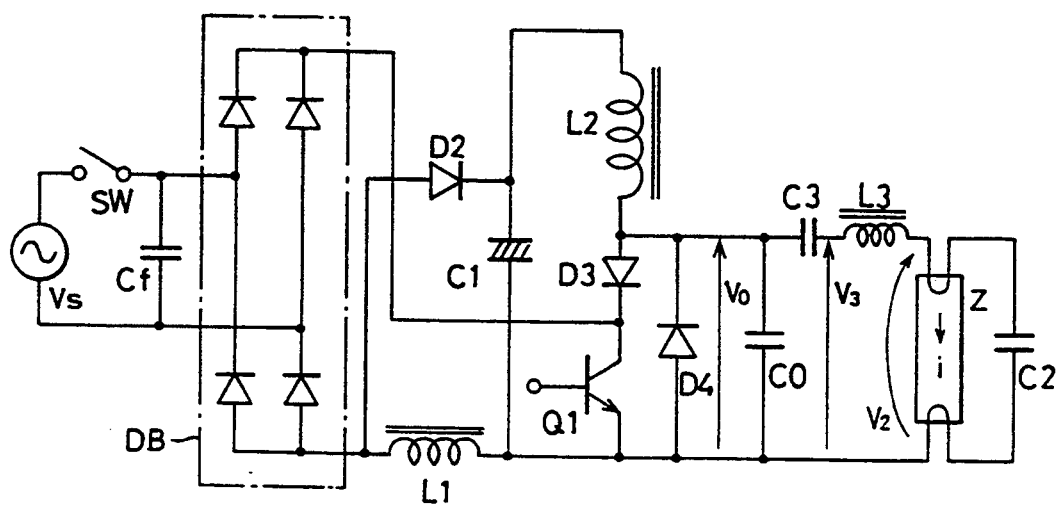
FIG. 12 shows in a circuit diagram another embodiment of the power device according to the present invention.

Referring now to FIG. 12, there is shown still another embodiment of the power device adapted to the supply of AC output, in which the capacitor CO is connected at botch ends to the load Z through a series circuit of a capacitor C3 and an inductor L3. When the load Z is a discharge lamp, this connection is made with respect to source side terminals of filaments of the discharge lamp, while non-source side terminals of the filaments are connected to a capacitor C2. For the capacitor C3 referred to above, one having a larger capacity than the capacitors CO and C2 is employed, so as to attain a function of cutting any DC component and not to contribute to any resonance, whereas the capacitor C2 is a resonating capacitor and also acts to preheat the filaments of the discharge lamp employed as the load Z. The inductor L3 is also for resonating use, and forming a current limiting element (ballast) with respect to a lamp current of the discharge lamp as the load Z. Further, the inductor L2 has an inductance value set to be larger than that of the inductor L3, so as to perform a constant-current action, and to supply a stable power to a resonating circuit comprising the inductor L3 and capacitors CO and C2. All other constituents for the present embodiment are substantially the same as those in the embodiments of FIGS. 7 and 9, and the same operation can be realized.

Figure 13:
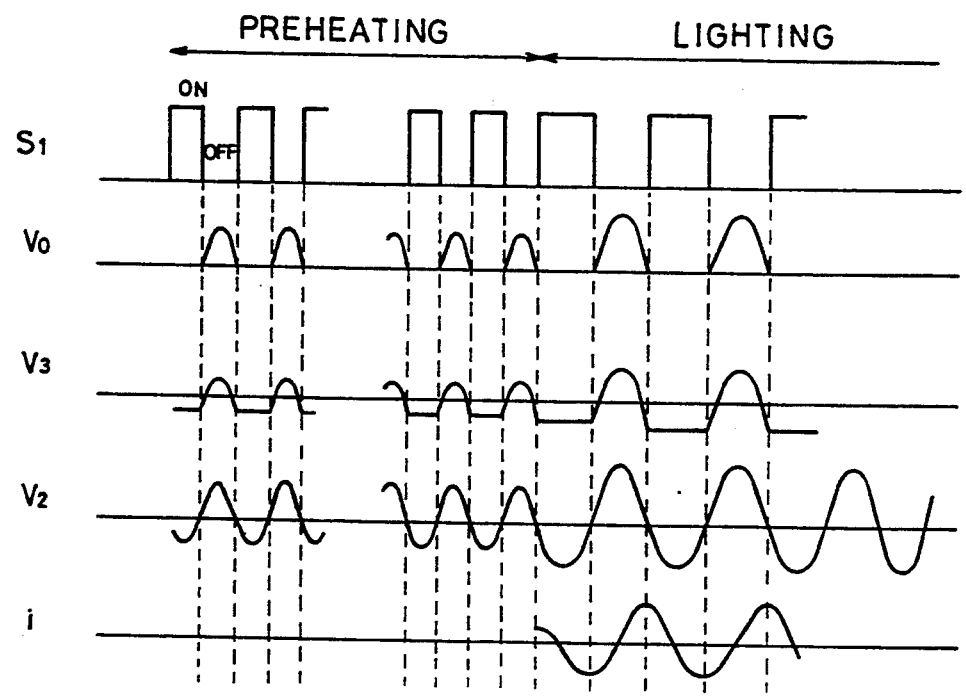
FIG. 13 shows in waveform diagrams the operation of the embodiment shown in FIG. 12.

Referring here to the operation of the present embodiment of FIG. 12 also with reference to FIG. 13, a load circuit including the discharge lamp as the load Z constitutes as a whole an inductive load. At the time of preheating the discharge lamp, a switching frequency is set to be sufficiently higher than a resonating frequency, and the resonating action becomes weak, upon which a preheating current is caused to flow through a path of the inductor L2, capacitor C2, inductor L3 and filaments of the discharge lamp as the load. After passing of a fixed time, the switching frequency of the switching element Q1 is lowered to be closer to the resonating frequency so as to render the latter to be strong, a high voltage is thereby applied to both ends of the discharge lamp as the load Z, and the discharge lamp is lit. As the discharge lamp is thus lit, the inductor L3 performs the function of the ballast, and a stable lighting is maintained. The voltage $V_0$ obtained across the capacitor CO at this time is discontinuous, but the power supplied to the discharge lamp can be made continuous by cutting the DC component with the coupling capacitor C3 and utilizing the resonating action of the resonating inductor L3 and capacitor C2. A voltage $V_2$ across the discharge lamp during its lighting involves a slight distortion due to the resonating action of the indictor L3, in contrast to a voltage $V_3$ at a junction point between the capacitor C3 and the inductor L3, but is still close to the sinusoidal voltage, and the current flowing to the discharge lamp is also close substantially to the sinusoidal wave. It should be appreciated that any radiation noise from the wiring to the discharge lamp and from the discharge lamp itself can be reduced thereby in contrast to the square wave lighting, so as to be able to reduce any component which generates high-frequency pulse. Since the voltage of the capacitor C1 is made to be of a pure direct current having no ripple component by the chopper action and the discharge lamp is lit with this voltage applied, it is possible to realize a flat and stable luminescence.

Figure 14:
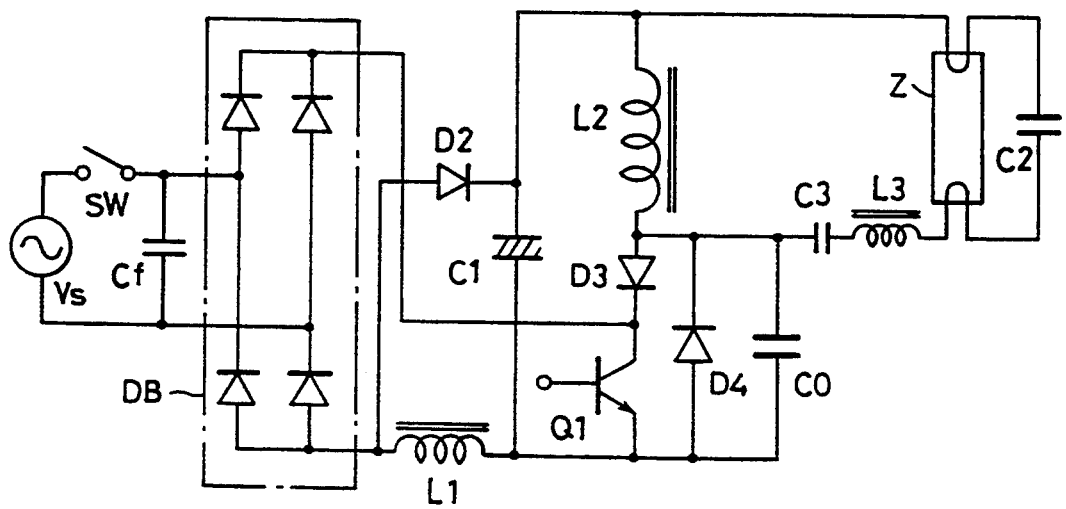
FIGS. 14 to 17 are circuit diagrams showing further embodiments of the power device according to the present invention.
Figure 15:
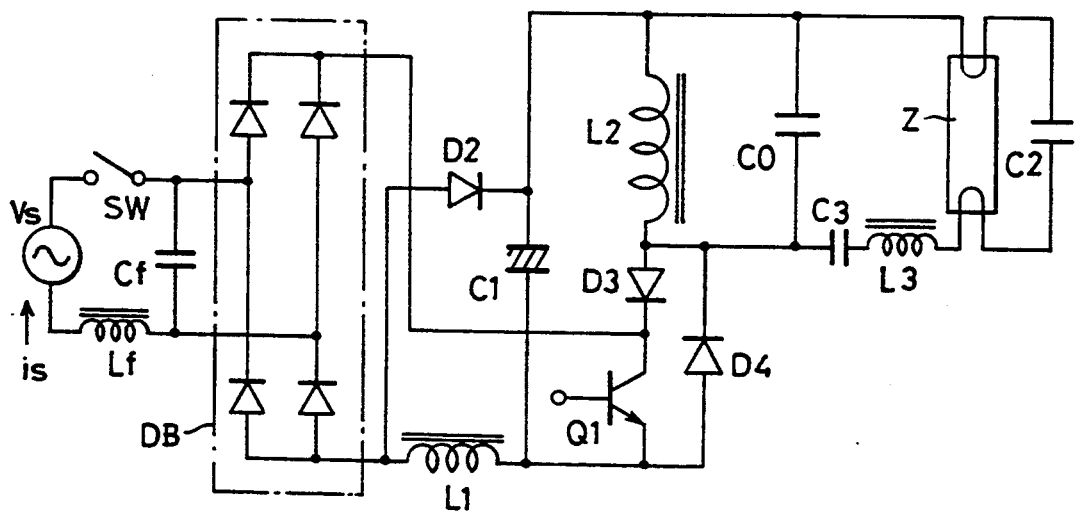

While in the embodiment of FIG. 12 the load circuit is shown to be connected in parallel to both ends of the capacitor CO, it is also possible to connect the load circuit in parallel to both ends of the inductor L2 as shown in FIG. 14. Further, as shown in FIG. 15, it is also possible to include the capacitor CO in this parallel connection of the load circuit to both ends of the inductor L2. In such embodiment as shown in FIG. 15, further, a low-pass filter is formed with an insertion of an inductor Lf along with the capacitor Cf in the AC input side of the full-wave rectifying circuit DB, whereby an input current $i_s$ made to be of a waveform involving less distortion and very smooth, and the high frequency component can be reduced.

Figure 16:
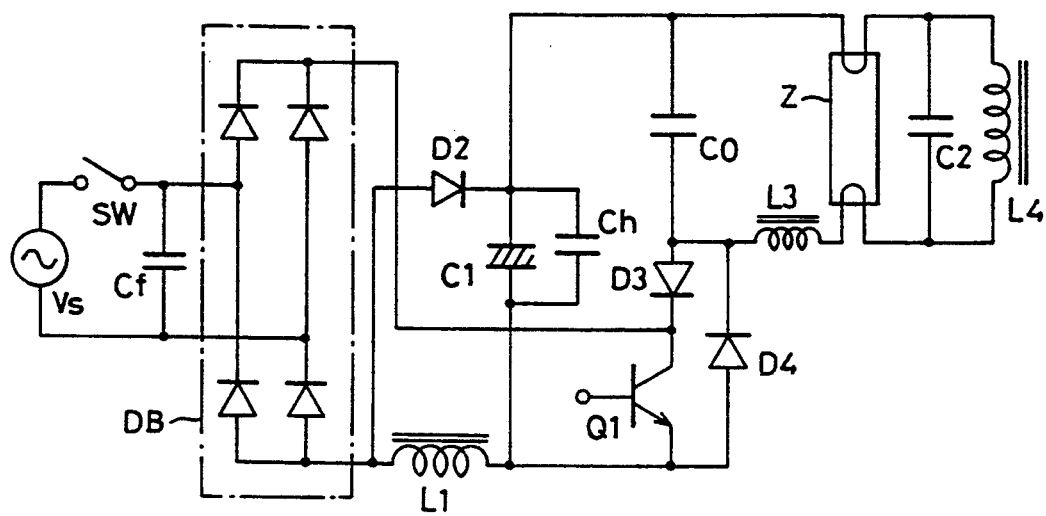

As shown in FIG. 16, further, it is possible to employ an arrangement in which an inductor L4 is connected in parallel, in addition to the capacitor C2, to the non-source side terminals of the filaments of the discharge lamp as the load Z. This inductor L4 is also used as a bypassing inductor which does not allow any DC component to flow to the discharge lamp as the load Z. In this case, the capacitors CO and C2 and inductor L3 operate as a resonating circuit of the inverter. Accordingly, it is made possible, with the arrangement of FIG. 16, to omit the DC-cutting capacitor C3 which is relatively of a large capacity, in contrast to the arrangements of FIGS. 12, 14 and 15. In this event, the inductor L3 performs the action of ballast, and the connection of this inductor L3 to the source side terminals of the filaments of the discharge lamp is effective to prevent the high frequency pulse noise from being fed back to the discharge lamp upon switching operation of the switching element Q1 or diode D3.

In FIGS. 14 to 16, all other constituents than those described are substantially the same as those in the foregoing embodiments of FIGS. 7, 9 and 12, and the same operation can be realized.

Figure 17:
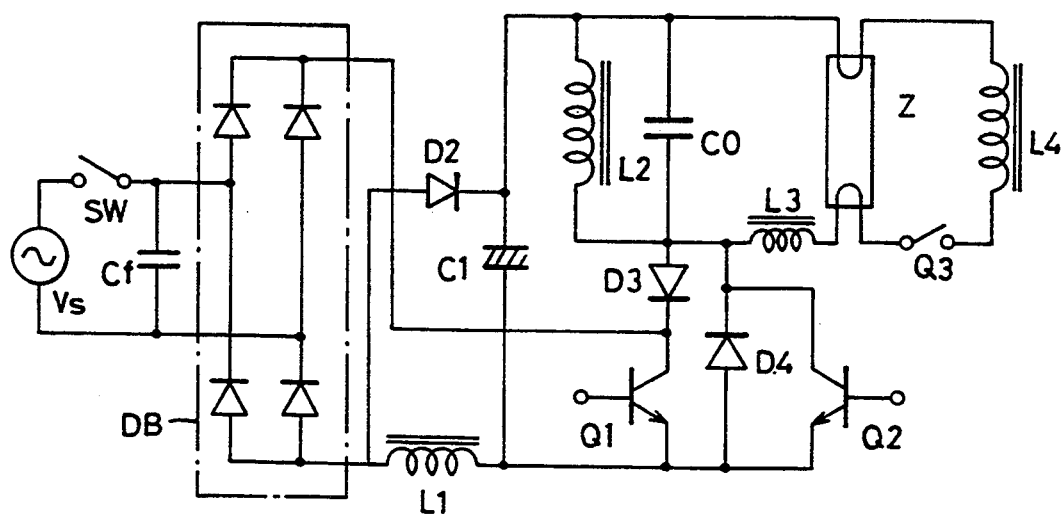

Referring to FIG. 17, there is shown still another embodiment of the power device for supplying the AC output. In the present instance, the arrangement is so made that the switching element Q1 can be used as a switching means acting commonly in the chopper circuit and in the inverter circuit under such light load condition as the preheating of the discharge lamp. Under such heavy load condition as the lighting operation, the load is excessive with respect to the switching element Q1 only, whereas a power transistor employable as the switching element Q1 is not easily available, for which reason another switching element Q2 is connected across the series circuit of the diode D3 and switching element Q1, and a power MOSFET is employed as this switching element Q2. With respect to the switching element Q2, the diode D4 is connected in reverse direction. Here, the switching element Q2 and diode D4 can be formed by a single parts when a reverse directional diode parasitized between drain and source of the power MOSFET is utilized as the diode D4. In FIG. 17, other constituents are the same as those in the foregoing embodiments of FIG. 7 et seq. and the same operation can be realized.

Figure 18:
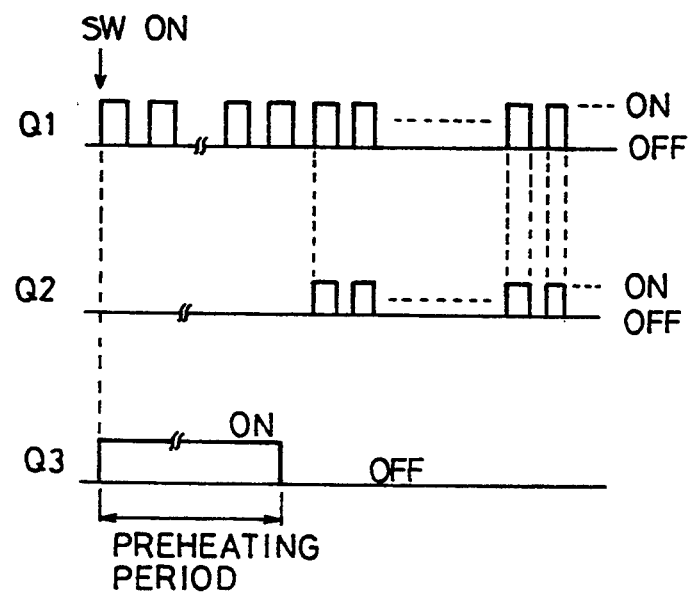
FIG. 18 shows in waveform diagrams the operation of the embodiment shown in FIG. 17.

Describing the operation of the embodiment shown in FIG. 17 with reference also to FIG. 18, the switching element Q2 is turned OFF so long as the load Z is under such light load condition as the preheating period of the discharge lamp, so as to have the switching element Q1 employed as the common switching means of the chopper and inverter circuits as has been referred to. Under the heavy load condition of the lighting period of the discharge lamp, the switching element Q1 is made exclusively for use as the chopper, and the switching element Q2 is turned ON so as to function as the switching means of the inverter circuit. In the preheating circuit including the inductor L4, a further switching element Q3 is inserted to be ON in the preheating period but to be OFF in the lighting period, so that the preheating current can be properly controlled preferably. While, in the case when the switching element Q1 is employed as the common switching means of the chopper and inverter circuits, the power loss accompanying to a normal directional voltage drop at the diode D3 is apt to become relatively large, this power loss can be made relatively small by causing a current which flows to the inverter circuit in the heavy load state of the load Z to flow to the other switching element Q2. Further, since the switching element Q1 can be of a small current capacity, the range of its selection can be expanded, and it is possible to render the device to be more economical than in the case of using the commonly employable switching element, even in view of total costs for two of the switching elements Q1 and Q2.

Figure 19:
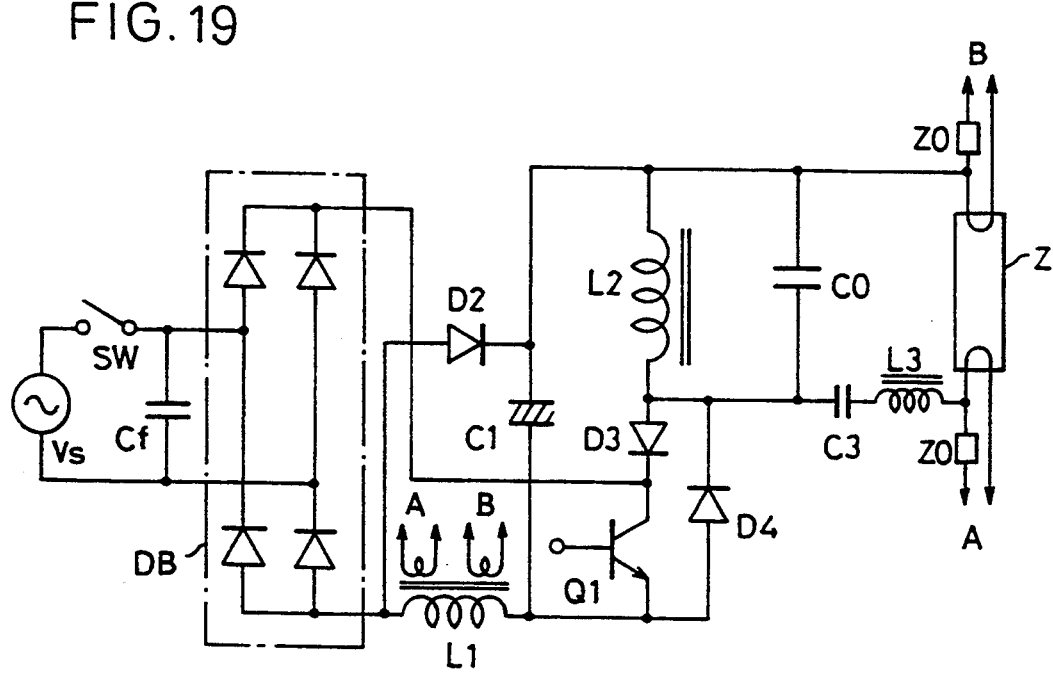
FIGS. 19 to 24 are circuit diagrams showing still further embodiments of the power device according to the present invention.

In a further embodiment shown in FIG. 19 of the power device according to the present invention, the inductor L1 is provided with secondary windings, and the arrangement is so made as to utilize these secondary windings for providing a preheating current to the discharge lamp as the load Z through an impedance element ZO. Other constituents in this embodiment of FIG. 19 are the same as those in the foregoing embodiments of FIG. 7 et seq., and the same operation can be realized.

Figure 20:
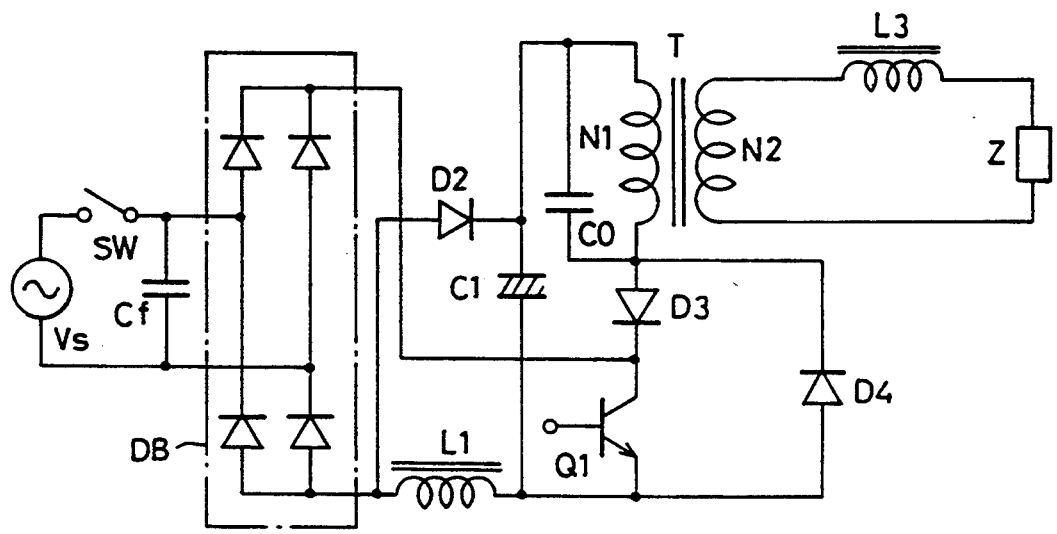
Figure 21:
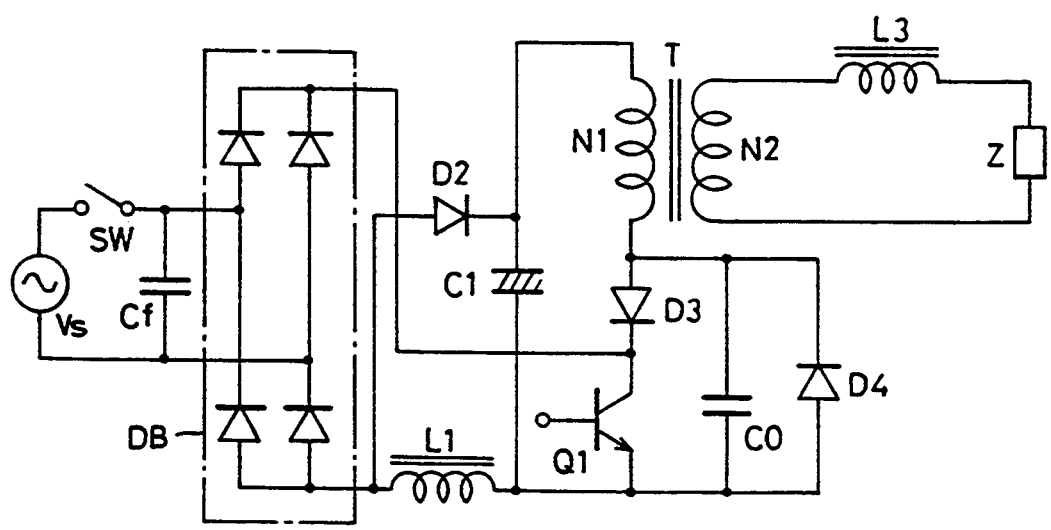
Figure 22:
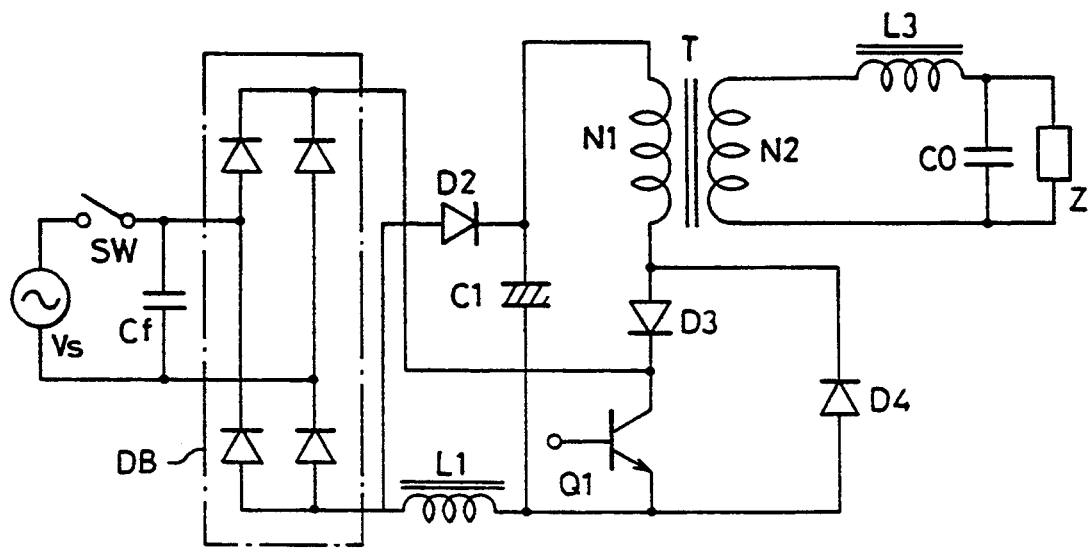

In further embodiments of the power device according to the present invention as shown in and described with reference to FIG. 20 et seq., the power supply to the load Z is carried out preferably through an insulating transformer T. In the embodiment of FIG. 20, first, the resonating capacitor CO is connected in parallel to the primary winding N1 of the transformer T, and the load Z is connected through the inductor L3 to the secondary winding N2 of the transformer T. In the embodiment of FIG. 21, the resonating capacitor CO is connected in series to the primary winding N1 of the transformer T, while the load Z is connected through the inductor L3 to the secondary winding N2 of the transformer T similarly to the embodiment of FIG. 20. In the embodiment of FIG. 22, the resonating capacitor CO is connected in parallel to the load Z on the side of the secondary winding N2 of the transformer T. While in these embodiments of FIGS. 20 to 22 the relative minimization in size of the device is hindered by the use of the transformer T, the use is effective to prevent an accident of electric shock at the load Z and thus to an improvement in the safety. When in particular the discharge lamp is employed as the load Z, these embodiments can prevent the accident of electric shock from occurring when the discharge lamp is exchanged.

Figure 23:
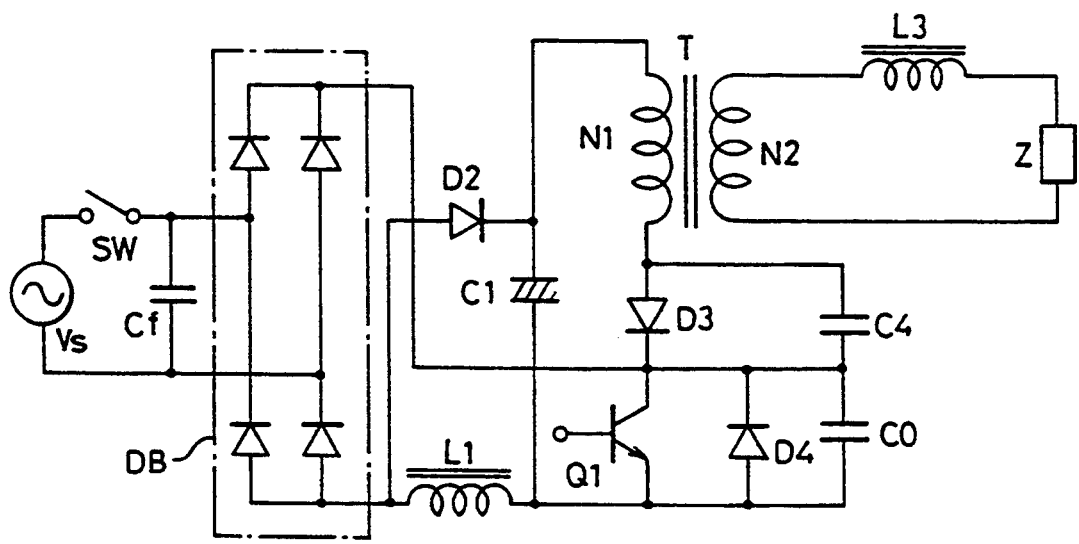

In the embodiment of FIG. 23, similarly to the embodiment of FIG. 21, the resonating capacitor CO is connected in series to the primary winding N1 of the insulating transformer T and the load Z is connected through the inductor L3 to the Secondary winding N2 of the transformer T, whereas a large capacity capacitor C4 is connected in parallel to the diode D3, and a capacitor CO of a small capacity is connected in parallel to the switching element Q1, whereby the diode D3 is enabled to execute its turn OFF operation by the capacitor C4. Accordingly, the device is arranged to be effective to prevent the accident of electric shock, any recovery loss accompanying to a reverse recovery current of the diode D3 is eliminated, and an inexpensive diode for use with low frequencies can be employed as the diode D3.

Figure 24:
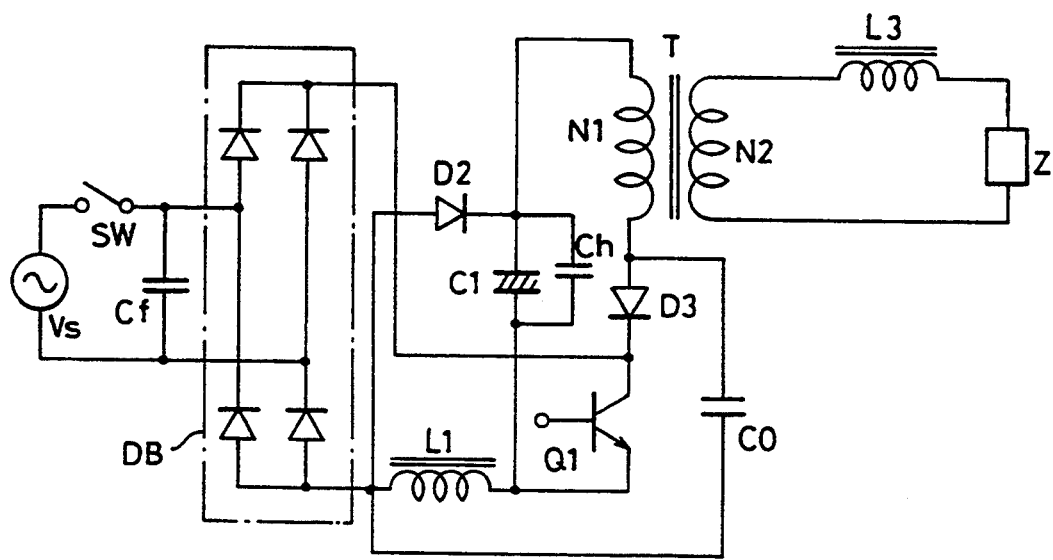

In the embodiment of FIG. 24, the load Z is connected through the inductor L3 to the secondary winding N2 of the transformer T, and the resonating capacitor CO disposed in series with respect to the primary winding N1 of the transformer T is connected in practice between a negative electrode side of the full-wave rectifying circuit DB and an anode side of the diode D3, whereby the electric-shock prevention with respect to the load Z is attained, and at the same time a resonating circuit is constituted by the capacitor CO and inductors L3 and L1. Consequently, the inductor L1 for the chopper circuit is also employed as the resonating inductor component, and the inductor L3 apt to become large in size can be minimized.

In these embodiments of FIGS. 20 to 24, all other constituents are the same as those in the foregoing embodiments of FIG. 7 et seq., and the same operation can be realized.

Figure 25:
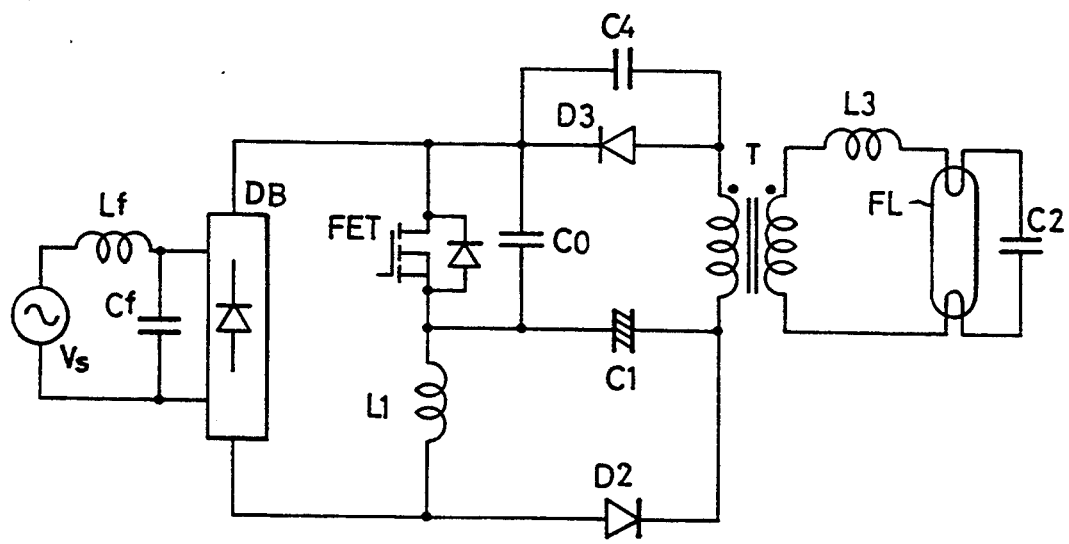
FIG. 25 is a circuit diagram showing the power device in a more practical aspect according to the present invention.

Referring now to FIG. 25 showing another embodiment of the power device providing the AC output, the AC input terminals of the full-wave rectifying circuit DB are connected through the inductor Lf to the AC power source Vs, and the filtering capacitor Cf of a small capacity is connected in parallel to the source. To the DC output terminals of the full-wave rectifying circuit DB, the inductor L1 is connected through an FET forming the switching element Q1, and a reverse directional diode is connected across drain and source ends of this FET. Across the drain and source ends of the FET, further, a series circuit of a diode D3 primary winding of the transformer T and capacitor C1 is connected, while the capacitor CO is also connected in parallel to the FET, and the diode D2 is connected between a junction point of the DC output terminals of the full,wave rectifying circuit DB to the inductor L1 and a junction point of the primary winding of the transformer T to the capacitor C1. Further, to the diode D3, the capacitor C4 is connected in parallel. To the secondary winding of the transformer T, on the other hand, the source side terminals of the filaments in the discharge lamp FL constituting the load are connected through the inductor L3, while a capacitor C5 is connected to the non-source side terminals of the filaments.

That is, the power device shown in FIG. 25 is constituted by an LPF, dither rectifying circuit, inverter commonly acting as a switching element of the dither rectifying circuit, transformer and load circuit. Here, the LPF is a single step LC filter having a cut-off frequency of 5 KHz, the dither rectifying circuit is designed to have an input power of 33.1 W with an input voltage of 100 V (the input power will be 34 W similar to ones available in the market when a consuming power of 0.9 W of control circuit and DC power source for the control circuit is added), and switching frequency is set to be 44 KHz, the same as inverter fluorescent lamps available in the market. The inverter acts also as the switching element of the dither rectifying circuit and can be formed with a lesser number of elements, and the control circuit can be also simplified. The transformer is formed preferably by a ferrite core and litz wire corresponding to the high frequency. The diode D3 and capacitor C4 can restrain a rush current of 50 Hz upon making of the power source, while the capacitor C4 functions so as not disturb resonance switching at 45 KHz of FET.

Further, the load circuit is formed with the discharge lamp, ballasting inductor, and preheating and noise preventing capacitor, and these inductor and capacitor may be of the same value as that of those available in the market. The LPF of 46 KHz is constituted by means of the ballasting inductor and preheating, noise preventing capacitor with respect to the discharge lamp, and the voltage close to the sinusoidal waveform is to be applied to the discharge lamp.

Figure 26:
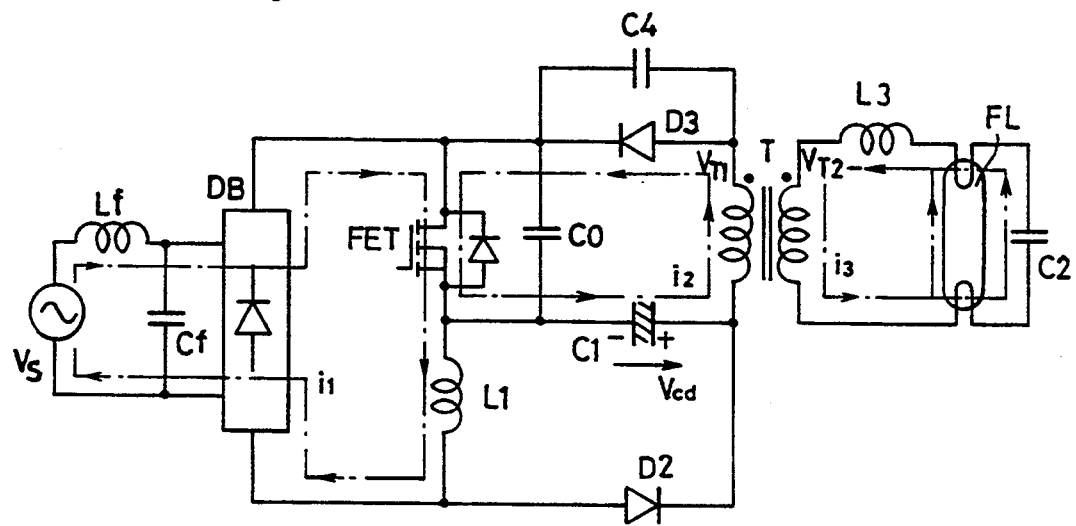
FIGS. 26 and 27 show in the same circuit diagram as FIG. 25 the operation of the working aspect of FIG. 25.

In the power device of FIG. 25, as will be clear when FIG. 26 is also referred to, the ON state of the FET causes the full-wave rectified source voltage Vs to be applied to the inductor L1, and a current $i_1$ is made to flow. Thus:

$$i_1 = 1/L * \int V_s \, dt = V_s/L \int dt$$

(here, source frequency << switching frequency)

Further, the FET acts also as the inverter switching element so that a closed circuit from the capacitor C1 through the primary winding of the transformer T, diode D3 and FET back to the capacitor C1 can be formed, and a current $i_2$ that renders $V_{T1} = V_{Cd} =$ constant to be attained, is made to flow. A voltage $V_{T2}$ at the secondary winding of the transformer T made therein to properly fall is applied through the LPF of fc=40 KHz and comprising the inductor L1 and capacitor C2, and a load current is made to flow. Here:

$$f_c = 1/[2\pi \sqrt{(L_3 * C_2)}] = 1/[2\pi \sqrt{(1mH * 12nF)}] = 46 KHz$$

Figure 27:
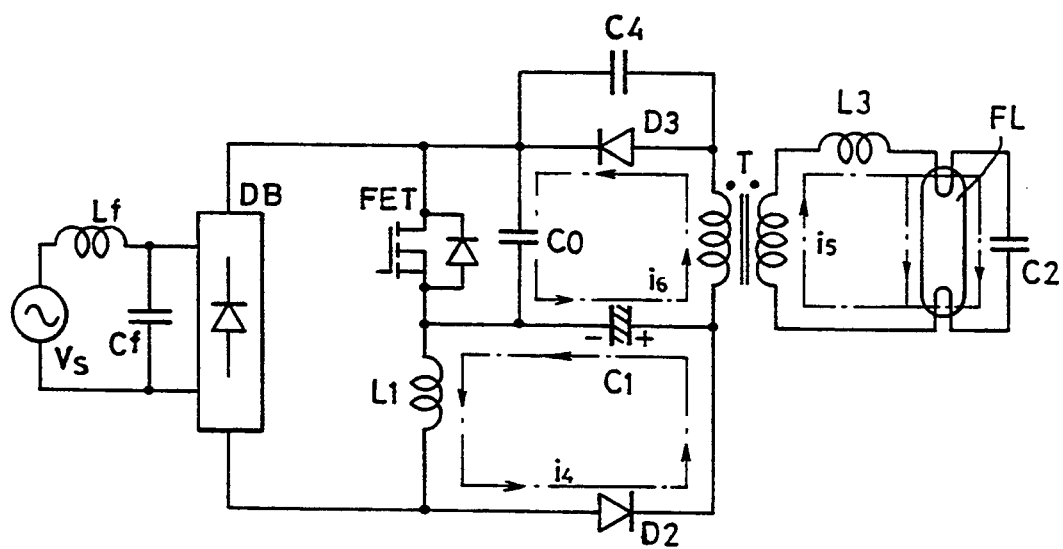

When on the other hand the FET is turned OFF, as will be clear when FIG. 27 is also referred to, a current $i_4$ is caused to flow by an energy accumulated during its ON state;

$$i_4 = i - V_{cd'}/L_1 * \int dt \quad (i' \text{ being maximum value upon every ON time of FET, } i' = i_{1max})$$
$$= i_4 \geq 0$$

and the capacitor C1 is charged thereby. Here, the time for which the current $i_4$ flows is determined by the voltage of the capacitor C1. When the capacitor C1 voltage is too high, the withstanding voltage is made higher so as to render required costs to become higher, whereas the capacitor voltage too low causes the current $i_4$ not enough for flowing during its OFF time so as to cause the input current waveform to be distorted, and it is required to properly set the capacitor voltage. Further, in the load circuit, a load current $i_5$ is made to flow by an energy accumulated in the inductor L1 and capacitor C1, and also a current $i_6$ is made to flow through the transformer coupling. This current $i_6$ is of a waveform of $i_3$ gradually decreasing due to influence of the load current $i_5$ on the current $i_3$ in ON state of the FET, and its direction is as shown in FIG. 27. With this current $i_6$, a zero voltage switching of the FET is carried out.

Figure 28:
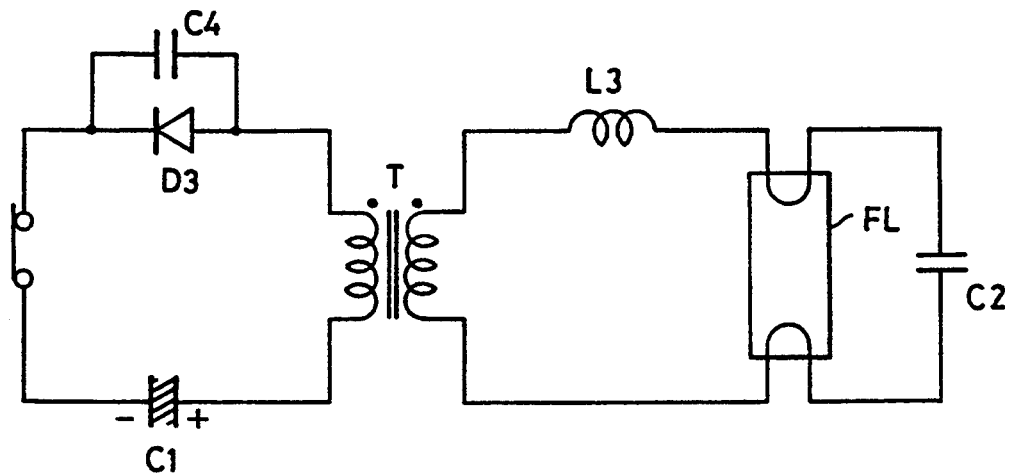
FIG. 28 is an explanatory circuit diagram for an operational relationship between an inverter circuit and a load circuit when a switching element is ON in the working aspect of FIG. 25.
Figure 29:
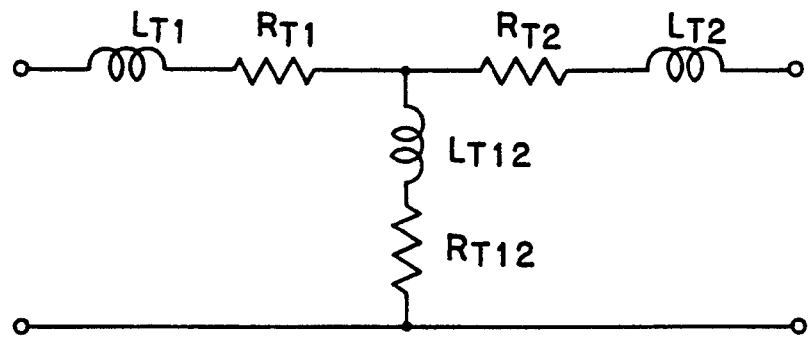
FIG. 29 is an equivalent circuit diagram of a high frequency transformer in the working aspect of FIG. 25.
Figure 30:
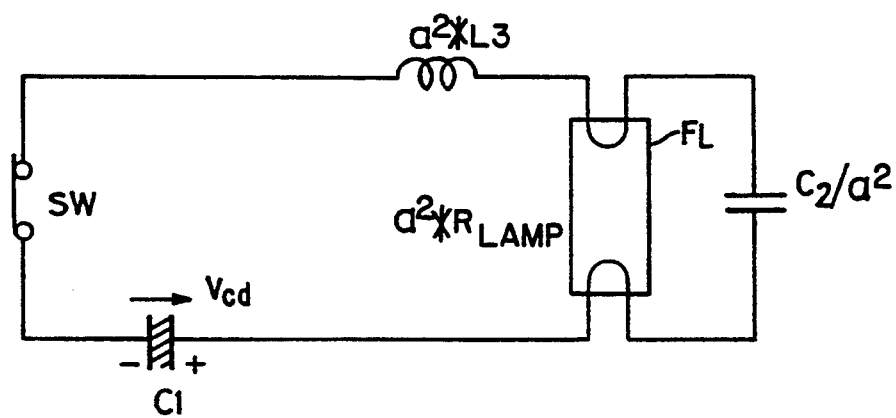
FIG. 30 is an equivalent circuit diagram of the inverter and load circuits with the switching element made ON in the working aspect of FIG. 25.

Referring more specifically to the arrangement and its operation of the power device shown in FIG. 25, its inverter and load circuit are so constituted as to perform a zero-voltage switching operation of resonating type. That is, in FIG. 28, there is shown the inverter and load circuit in the state Where the FET is ON, upon which the FET voltage is $V_{FET}=0$. The capacitor CO does not participate in the operation. Here, an equivalent circuit of the transformer T will be as shown in FIG. 29 so that $L_{T1}, L_{T2} << L_3$; $R_{T1}, R_{T2} << R_{LAMP}$ (discharge lamp's equivalent resistance); $L_{T12} << L_3$, and, so long as this is an ideal transformer, the circuit can be simplified. Here, $R_{LAMP}$ is the equivalent resistance of the discharge lamp, and a:1 is winding ratio of the transformer T. On the other hand, the voltage $V_{T1}$ (at the primary winding of the transformer T) applied to the load circuit will become a step voltage of $V=V_{cd}$ simultaneously with the turning ON of the FET (of course the discharge lamp voltage is a result of the step voltage passed through the LPF). An equivalent circuit of the inverter and load circuit in this case is shown in FIG. 30.

Figure 31:
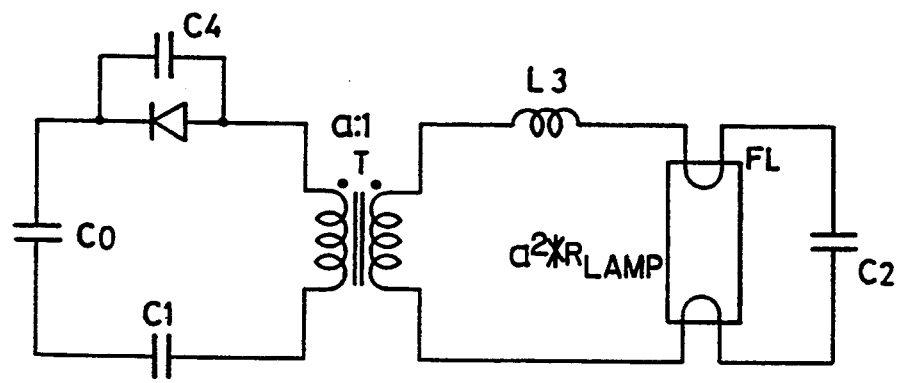
FIG. 31 is an explanatory circuit diagram for an oparational relationship between the inverter and load circuits with the switching element made OFF in the working aspect of FIG. 25.
Figure 32:
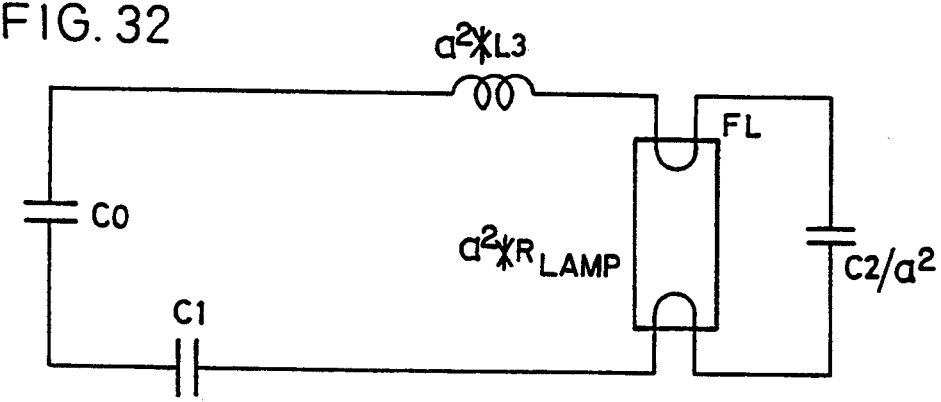
FIG. 32 is an equivalent circuit of the inverter and load circuits with the switching element made OFF in the working aspect of FIG. 25.

In FIG. 31, the inverter and load circuit in the state where the FET is OFF are shown, and the capacitor CO participates in the operation during OFF state of the FET. So long as the transformer is assumed to be the ideal one, as in the case of the ON operation of FET, an equivalent circuit to the inverter and load circuits will be as in FIG. 32. Since $$CO, C_2 << C_1, C_4$$

here, the resonating frequency f of the inverter and load circuit will be $$f = 1/[2\pi \sqrt{(a^{2}*L3*((CO*C2/a^{2})/(CO + C2)a^{2}))}\ ] = 1/[2\pi \sqrt{(1.31^{2}*1mH*((4.4nF*12nF/1.31^{2})/(4.4nF + 12nF)*1.31^{2}))}\ ] = 75KHz$$

Figure 33:
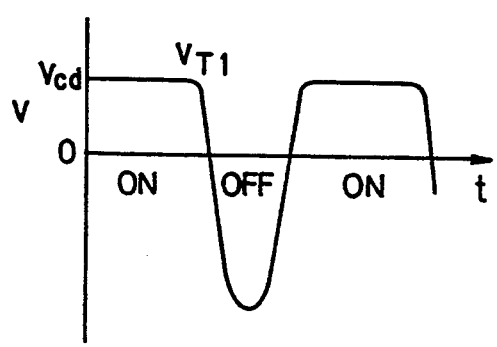
FIG. 33 is a waveform diagram showing a primary side voltage in the high frequency transformer in the working aspect of FIG. 25.
Figure 34:
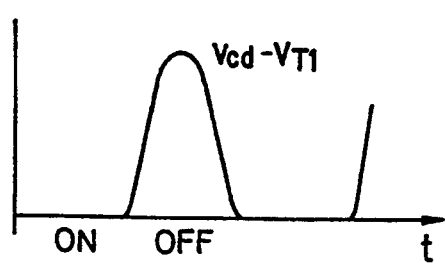
FIG. 34 is a waveform diagram showing a voltage at the switching element in the working aspect of FIG. 25.

Accordingly, the voltage $V_{T1}$ on the primary winding side of the transformer T performs its one cycle with $V_{t1}=Vcd$ made as the initial value, as shown in FIG. 33, during OFF state of the FET (at a frequency $\approx 88$ KHz about twice as large as the switching frequency 44 KHz). Therefore, the FET voltage will be $V_{FET}=V_{CO}=V_{T1}-Vcd$, and will be as shown in FIG. 34 during the OFF state of the FET. Upon turning OFF of FET, the voltage starts rising and, when the voltage comes closer to zero again after passing of one cycle, the FET turns ON, so that the switching loss can be reduced by the zero voltage switching, as will be appreciated.

What is claimed is:

1. A power device comprising:
   a full-wave rectifying circuit for full-wave rectifying AC power and producing a DC output,
   switching means for adding a frequency to the DC output of said full-wave rectifying circuit through high-frequency interruption of the DC output,
   inductor means connected through said switching means to the DC output of said full-wave rectifying circuit,
   a first reverse-current preventing element connected to said inductor means,
   a smoothing capacitor connected to said inductor means through said first reverse-current preventing element,
   a second reverse-current preventing element connected to prevent a current from flowing from said full-wave rectifying circuit to said smoothing capacitor, and
   a load circuit connected through said switching means and said second reverse-current preventing element to said smoothing capacitor.

2. The device according to claim 1 wherein said switching means includes first switching means, said inductor means includes a first inductor connected through said first switching means to the DC output of said full-wave rectifying circuit, said first reverse-current preventing circuit comprises second switching means, said smoothing capacitor comprises a first capacitor connected through said second switching means to said first inductor, and said second reverse-current preventing element comprises a third switching means, and including:
   a second inductor connected through said first and third switching means to said first capacitor; and
   a second capacitor connected in a resonant circuit with said second inductor wherein said third switching means prevents a current from flowing from said full-wave rectifying circuit to said first capacitor.

3. The device according to claim 2 wherein said first and second switching means are alternately turned ON and OFF.

4. The device according to claim 2 wherein said second and third switching means are, respectively, first and second reverse current preventing diodes.

5. The device according to claim 4 wherein said load circuit includes a discharge lamp, and a load inductor connected in series with said discharge lamp and disposed between said second diode and said discharge lamp.

6. The device according to claim 2 comprising a diode connected in reverse parallel to said first switching means wherein said third switching means is a second diode, and including a reverse recovery capacitor connected in parallel to said third switching means.

7. The device according to claim 2 wherein said first and third switching means are connected in series and said first and second switching means are provided for mutual synchronizing operation upon application of a large load current to the series circuit of said first and third switching means.

8. The device according to claim 2 wherein said load circuit includes a discharge lamp having filaments, and said first inductor includes a pre-heating winding for supplying a pre-heating current to said filaments of said discharge lamp.

9. The device according to claim 1 wherein said first and second reverse-current preventing elements are, respectively, first and second diodes.

* * * * *